US012042463B2

(12) United States Patent
Nema

(10) Patent No.: US 12,042,463 B2
(45) Date of Patent: Jul. 23, 2024

(54) MODULAR PLATFORM OF BASE, PLUGINS, OVERLAYS, AND REACH ARMS FOR MISCELLANEOUS APPLICATIONS

(71) Applicant: Waleed S Nema, Richardson, TX (US)

(72) Inventor: Waleed S Nema, Richardson, TX (US)

( * ) Notice: Subject to any disclaimer, the term of this patent is extended or adjusted under 35 U.S.C. 154(b) by 142 days.

(21) Appl. No.: 17/805,537

(22) Filed: Jun. 6, 2022

(65) Prior Publication Data

US 2023/0390141 A1 Dec. 7, 2023

(51) Int. Cl.
*A61H 7/00* (2006.01)
*A47K 7/02* (2006.01)

(52) U.S. Cl.
CPC ............. *A61H 7/003* (2013.01); *A47K 7/022* (2013.01); *A47K 7/028* (2013.01); *A61H 2205/081* (2013.01)

(58) Field of Classification Search
CPC . A47K 7/00; A47K 7/02; A47K 7/022; A47K 7/028; A47L 13/44; A47L 13/46; A47L 13/254; A47L 13/256; A47L 13/42; A61H 7/003
USPC ............................................... 15/231, 229.13
See application file for complete search history.

(56) References Cited

U.S. PATENT DOCUMENTS 4,258,414 A * 3/1981 Sokol ...................... F21V 21/29
362/398
5,012,544 A * 5/1991 Verry ..................... A47K 7/028
15/228
5,365,631 A * 11/1994 Emerick ................ A47L 13/46
294/99.1

FOREIGN PATENT DOCUMENTS

KR 920002812 Y1 * 5/1992 ............. A47K 7/028

* cited by examiner

*Primary Examiner* — Daniel J Colilla

(57) ABSTRACT

The present invention is a modular platform for assembling a device for miscellaneous applications, comprising a base to which either a plugin and/or an overlay may be attached, each serving specific functionality including cleaning, back scratching, massaging, scrubbing (with a surface adapting to body contours as per one embodiment), applying lotion/medication, etc. The base has a pipe-like hollow handle through which a normal or telescopic elongated reach arm may be fastened. Alternatively, handle endings may be fitted with an insert connectable to a matching reach arm. An example configuration is a ball/socket joint insert allowing free multi-axial rotation of a matching reach arm. Having the handle/device in between reach arms gives more control over directionality, coverage, and pressure over the target body area yielding more effective function. Included as a matter of illustration not limitation are: adaptive, massager, and general-purpose embodiments.

12 Claims, 11 Drawing Sheets

(Embodiment 1a)

(Embodiment 1b)

(Embodiment 2)

(Embodiment 3)

FIG. 30
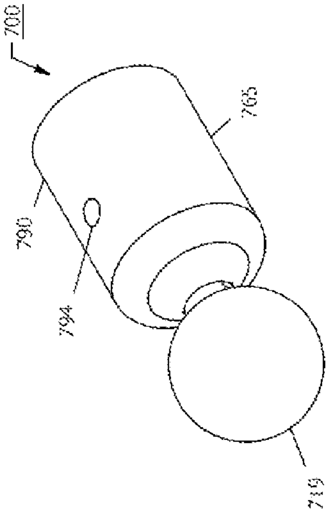
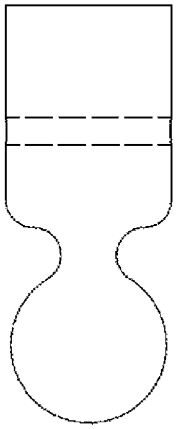
FIG. 28
FIG. 29
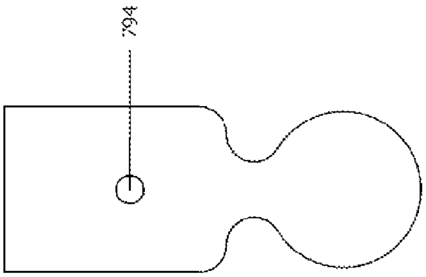
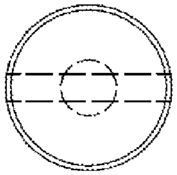
FIG. 27

MODULAR PLATFORM OF BASE, PLUGINS, OVERLAYS, AND REACH ARMS FOR MISCELLANEOUS APPLICATIONS

CROSS-REFERENCE TO RELATED APPLICATIONS

This application claims the benefit of provisional patent application No. 63/260,316 filed on 2021 Aug. 17 by the present inventor.

FEDERALLY SPONSORED RESEARCH AND DEVELOPMENT

Not applicable

REFERENCE TO A "SEQUENCE LISTING", A TABLE, OR A COMPUTER PROGRAM LISTING APPENDIX SUBMITTED ON A COMPACT DISC AND AN INCORPORATION-BY-REFERENCE OF THE MATERIAL ON THE COMPACT DISC

Not applicable

PRIOR ART

Humans have devised a variety of inventions to address the need to reach hard-to-reach places such as high places or one's own back for scratching, scrubbing, massaging, or lotion/medication application. Associated with the reach problem are other problems including: direction, adaptivity, pressure, and coverage. For instance, directing the device to reach the right spot, adapting to body/shape contours of the spot, applying needed pressure at the spot, and being able to cover all desired spots timely without much repositioning or frustration are issues seldom addressed collectively. Additional important usage factors include ease of use, time, and effectiveness. All these objectives, in addition to modularity, were driving forces behind this invention.

Generally, prior art solutions for back scratching/scrubbing could be classified as manual by moving a hand-held device over the body or by moving the body against a wall-mounted device. The mechanism could also be automatic where scrubbing parts are moved by electric/battery or by mechanical power using water flow to move scrubbing mechanical parts One reachability solution approach in prior art is to use an aid such as a long rigid arm with a cleaning/scratching head at the end, as in patent classification A47K7/028. Another approach is to mount the scrubbing device to a wall and move one's back against the device. A third approach is to use a belt-like device with handles on both ends.

Solutions that mount to a vertical surface like a wall are not portable, quick, or easy to use. Height of the mounting point is an issue not just for different people but even for the same person reaching different body parts.

Belt-like solutions such as patents US20130098381A1 and US20180116901A1 have loops for the hands and a scrubbing surface in between made of cloth or silicon and shaped like a belt to be pulled back and forth across the desired scratching/scrubbing area. Frequent repositioning is required and too little pressure can be exerted where needed. It is also easy to miss areas due to the typical elongated shape of scrubber.

Solutions with a rigid handle (classification A47K7/028) such as U.S. Pat. No. 8,967,898B1 typically have a head with small surface area that does not work with existing scrubs like gloves or washcloths that users may be accustomed to. This usually leads to demanding too much repositioning making the mechanism not so effective or popular.

U.S. Pat. No. 7,500,282B1, Modular system for stimulation and exfoliation of human skin, to Stewart Park discloses a hand-held device detachably interconnected with other like devices to form a variety of differently configured arrays formed by a multitude of interconnected scrubbing devices. The user applies a selected amount of pressure on the prongs or elastically resilient projections to secure different intensities of pressure and scrubbing or exfoliation action on selected areas of the skin. Park's modularity is a matter of configuration arrangement of the same device. As disclosed, the device seems more fit for therapeutic application rather than uniform and quick scrubbing. Directionality and back reachability are not disclosed.

Patent US20130098381A1 has compartments for soap bars making the device stiff, heavy, and not able to adapt to body contours. Since handles are at the ends, there is no pressure from the device onto the middle to create effective pressure for scrubbing.

U.S. Pat. No. 2,740,150A to Charles E Wilding discloses a back scrubber with a convex circular head to which a washcloth is secured using an elastic ring while U.S. Pat. No. 3,085,276A uses a concave strip to adapt to shoulders and body sides. Both approaches may be needed but are not possible using the same device unless modularity of different purpose-built plugins is possible.

U.S. Pat. No. 2,456,782A is similar to US20130098381A1 in mounting a washcloth on a convex head but using a different mechanism to affix the washcloth onto the head. While this may work for the disclosed purpose, it is not versatile or general enough for different kinds of applications or overlays.

U.S. Pat. No. 8,020,242B2, Human torso scrubbing apparatus, uses a grasping handle that is 75 to 115 degrees from the distal part ending with a scrubbing element. The limited length and shape of the handle adversely impact reach, pressure, and coverage without too much repositioning.

Patent EP1764019B1, Device for cleaning the skin, is a skin cleanser device with a surface that is made from elastically-deformable synthetic material other than a foam for better contact with the skin.

U.S. Pat. No. 4,381,766A, Back applicator is used to apply lotions or meds to the back area where it is difficult to reach. The applicator's free-floating pad allows it to conform to the back as it slides over skin but it has one-axis up/down degrees of freedom. Being one-handed and having to move the device from one hand to the other are limiting.

U.S. Pat. No. 3,568,237A discloses a sponge detachably connected to a curved handle for washing one's back using a pivot pin. Movement of the sponge head is limited to one axis of rotation. Like U.S. Pat. No. 4,381,766A, being one-handed operation is limiting.

U.S. Pat. No. 4,078,865A discloses a liquid applicator with a straight rigid handle making it hard to reach all parts of the back.

U.S. Pat. No. 5,058,234A focuses on the curvature of the handle claiming that the most optimal degree of curvature is between 15 and 18 degrees based on experimentation but does not indicate any scientific basis or hypotheses made related to gender, age, body proportions, etc.

U.S. Pat. No. 4,184,221A discloses a bath brush with clips for a removable face cloth. The brush has a continuously curved handle at a rate of curvature comparable to a clothes hanger. U.S. Pat. Nos. 4,171,171A, 6,438,787B1, 3,568,237A also use curved rigid handle with a grip.

Patent US20090093743A1, Versatile back treatment implement system, to Jean P. Corzine has a telescopic rigid stick ending with a rectangular implement that can be turned up, down, or in a horizontal direction to ensure various contours of the surface of the human back can be equally treated with lotion, message, or brushing. Too much repositioning is required and the ability to apply adequate pressure could be lacking. The design does not incorporate fixing and using existing scrubbing overlays. Modularity is limited as well.

Patent US20050005385A1, Washcloth holder, to Gale Smith attaches an external scrubbing member to a scrubbing head via a band that goes on top of the scrubbing member into a groove on the scrubbing head. The head is connected to a rigid handle as one piece. The head itself is rigid and is not movable which negatively impacts good reach and closer body contact. The surface of the head is not designed for plug-in replacements.

Patent US20060168749A1 discloses a bendable bathing scrubber for hard-to-reach areas like the back.

U.S. Pat. No. 6,546,588B1 uses an elastometric coupler like a spring to allow an extension arm to move pivotally with unlimited angular relation with respect to the primary arm.

U.S. Pat. No. 5,012,544A discloses a rigid handle ending with a plate to which a washcloth can be secured using two straps at plate ends.

U.S. Pat. No. 2,070,123A discloses a stiff wire shaped to receive a rubber bath sponge at one end of a right angle stem and shaped as a handle on the other end with a coil loop for a finger to protect against slipping out of the hand as often happens if soap or soapy water is on the handle or the hand.

U.S. Pat. No. 3,571,837A discloses a scrubber with a means for securing the scrub to the head is via passing the cloth through a pair of spaced apart openings with a clamp on the back.

U.S. Pat. No. 2,100,477A, Washrag holder, clamps a hinged ring over a rag covering a round head.

U.S. Pat. No. 10,334,994B1 basically encloses a top ring over a bottom ring with the cleaning implement in between.

U.S. Pat. Nos. 10,442,072B2 and 8,020,242B2 address reachability using an elbow shaped arm with an angle around 90 degrees.

Out of the multitude of issued patents in this space, many have expired due to fees, which may indicate the patents may not have made it to the commercial market possibly due to issues related to reachability, direction, adaptivity, pressure, coverage, time/effort, ease of use, or effectiveness. These issues were motivations that led to the current invention.

Advantages: It is believed that the current invention presents a novel, simple, portable, affordable, quick, easy to use, and effective solution that solves many challenges in ways not seen in prior art or in the market. This invention is also uniquely customizable allowing the device to be outfitted with preferred surface overlays in different configurable ways. Additionally, it opens the door for creativity via the modular design that allows newly needed future plugins and overlays to be added. Therefore, this invention is expected to yield superior results.

BACKGROUND OF THE INVENTION

FIELD: The present invention relates to a modular platform made of base, plugins overlays, and reach arms intended for multiple miscellaneous applications. Specifically, the applications include body washing, scrubbing, scratching, and massaging implements.

SUMMARY OF THE INVENTION

This invention constitutes a modular platform of base, plugins, overlays, and reach arms assembled into device embodiments serving different purposes. As such, included embodiments are presented as a matter of illustration not limitation.

According to one embodiment, a base is connected to a miscellaneous plugin with anti-sliding layer for better grip with overlays.

According to another embodiment, a base is connected to an adaptive plugin which may also have an overlay such as a washcloth/scrubber. Adaptivity allows better conformance of plugin surface to body contours of target object.

According to another embodiment, a base is connected to a purpose-built massager plugin.

Modularity allows other new potential embodiments to be created for purpose-built functions.

Reach arms serve the purpose of having more control over the device serving hard-to-reach areas. Better control means better reach coverage, better directionality, and the ability to apply more pressure on the served area, which is otherwise not easy for hard-to-reach areas.

Reach arms are two kinds: 1) connectable to device handle directly, such as stick reach arms; 2) connectable to device handle via a handle insert, such as ball/socket reach arms that work in a ball-and-socket joint allowing multi-axial rotation.

The handle may be used with and without any reach arms.

The handle may be used with one stick reach arm passing through the handle and extending on both ends.

The handle may have separate/different reach arms on both ends.

The ball/socket reach arm may be detachably connected to a ball/socket joint insert at either end.

The reach arm may be fixed in length or may be telescopic.

The base, plugin, and reach arm can be made of firm material which may be bendably flexible.

BRIEF DESCRIPTION OF DRAWINGS

FIG. 1 is a perspective view of base with misc plugin and overlay. It is Embodiment 1a.

FIG. 2 is a perspective view of base with misc plugin. It is Embodiment 1b.

FIG. 3 is a perspective view of base with adaptive plugin. It is Embodiment 2.

FIG. 4 is a perspective view of base with massager plugin. It is Embodiment 3.

FIG. 5 is an exploded view of Embodiment 1a.

FIG. 3A is a perspective top view Detail A of plugin-misc.

FIG. 27 is a front view of ball joint.
FIG. 28 is a side view of ball joint.
FIG. 29 is a top view of ball joint.
FIG. 30 is a perspective top view of ball joint.

NAMING/NUMBERING CONVENTION

Figures 1, 2, 3, 4:
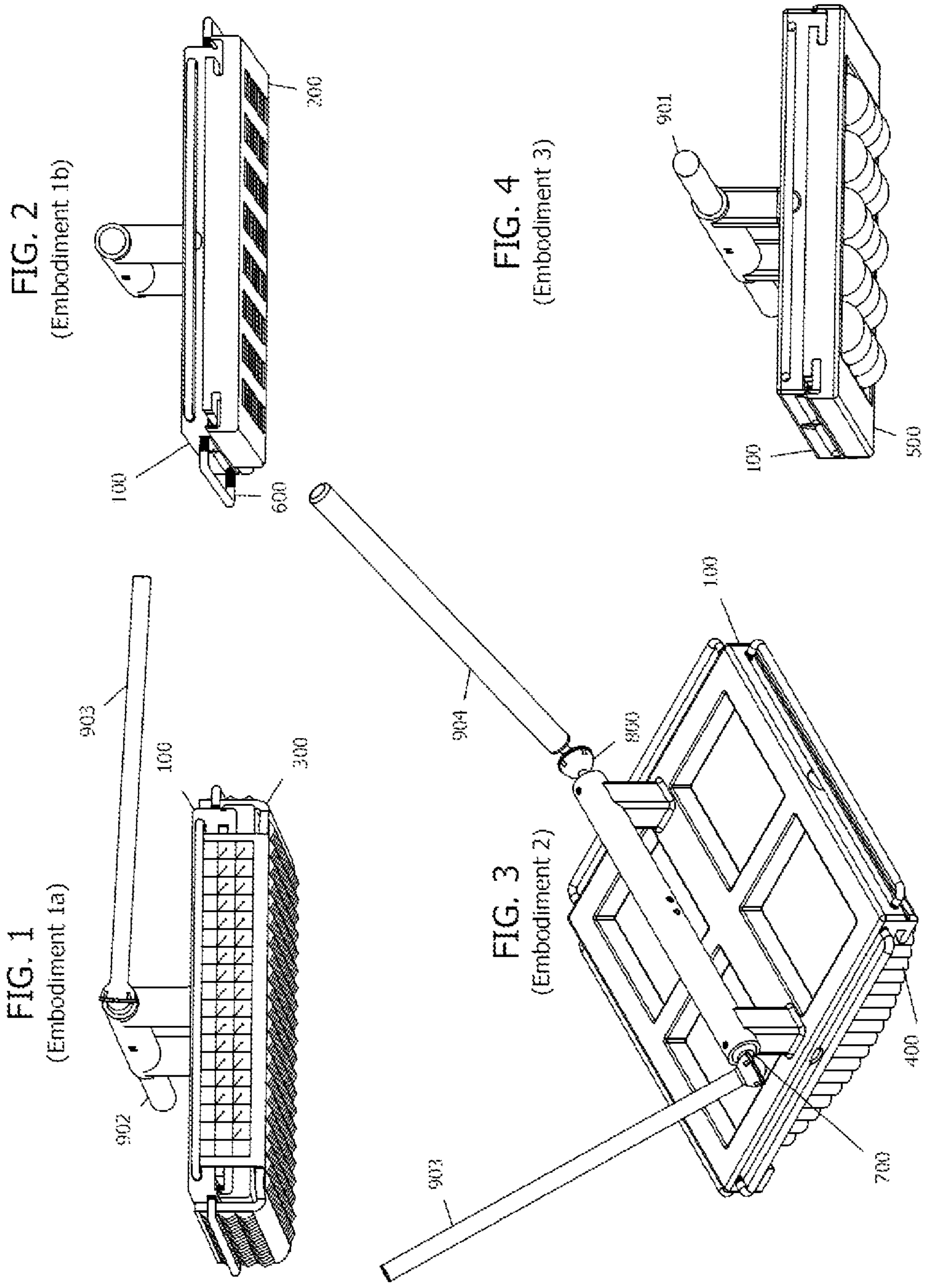

FIGS. 1-5 are more general; they show embodiments and an exploded view.

Parts are numbered in multiples of 100.

All parts have 3-digit numbers appearing on corresponding part detail sheets.

Drawing items that are similar or work together are given similar numbering. For instance, tubular feature 765 is similar to 865, both are insertable into tubular feature. Similarly, spring ball 130 snaps into the corresponding plugin hole 230, 430, or 530. The same applies for 660/160; 794/194; 894/194; 892/192.

The following table has a section for each drawing sheet. It starts with the title of the drawing sheet, a brief description, a listing of parts and sub-figures on the sheet, followed by a table of reference numerals.

DESCRIPTION AND REFERENCE NUMERALS

Sheet 1 of 11
Embodiments
Shows all illustrated embodiments. Reference numerals that are multiples of 100 have a corresponding sheet with that figure number.

Figure 13A:
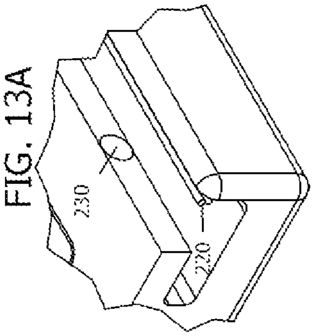
FIG. 13 is a perspective top view of plugin-misc.
Figure 13:
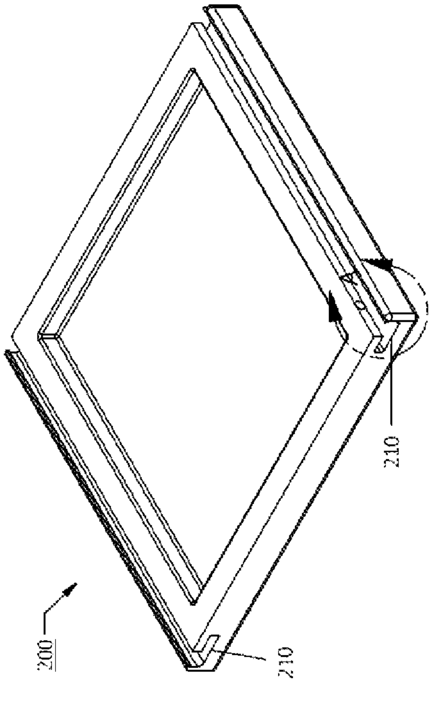
Figure 12:
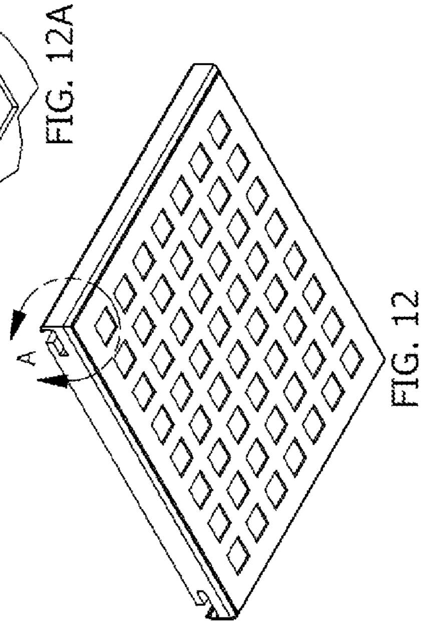
FIG. 12 is a perspective bottom view of plugin-misc.
Figure 11A:
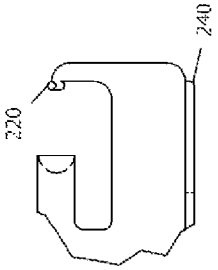
FIG. 11A is a front view Detail A of plugin-misc.
Figure 11:
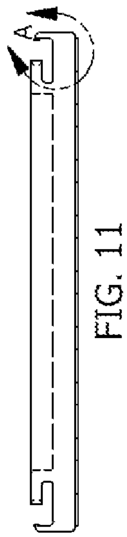
FIG. 11 is a front view of plugin-misc.
Figure 15:
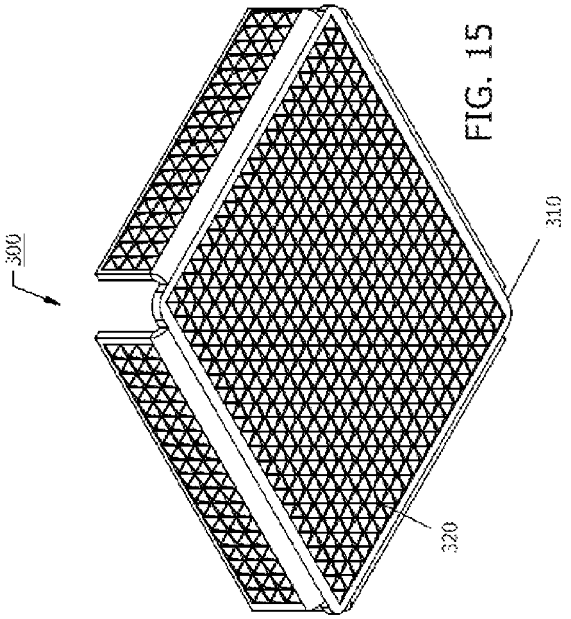
FIG. 15 is a perspective bottom view of overlay.
Figure 16:
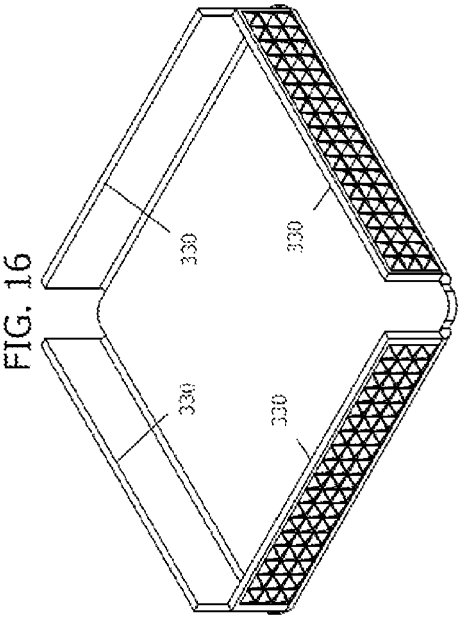
FIG. 16 is a perspective top view of overlay.
Figure 14:
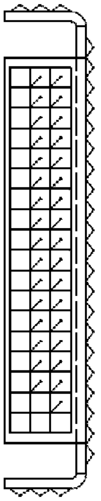
FIG. 14 is a front view of overlay.
Figure 17:
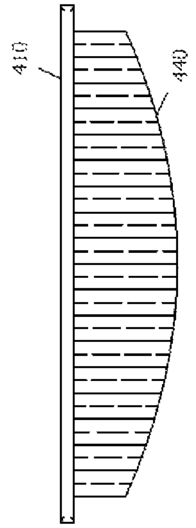
FIG. 17 is a front view of plugin-adaptive.
Figure 18:
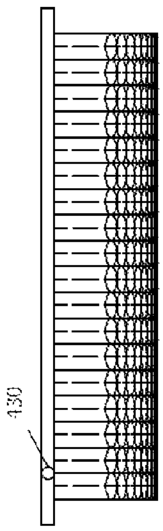
FIG. 18 is a side view of plugin-adaptive.
Figure 19:
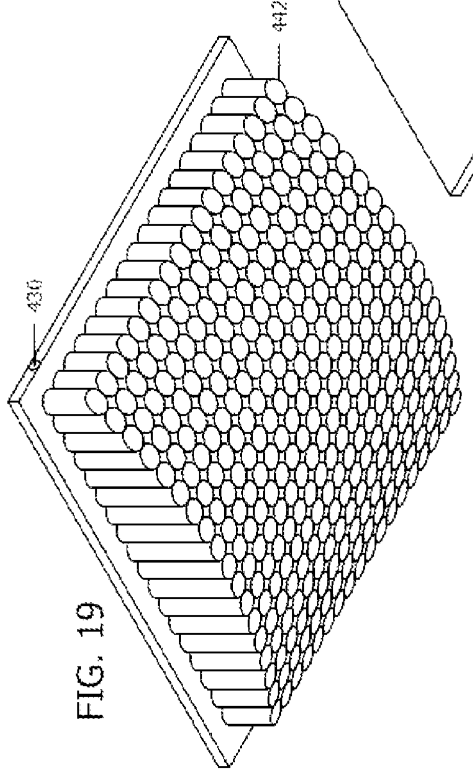
FIG. 19 is a perspective bottom view of plugin-adaptive.
Figure 20:
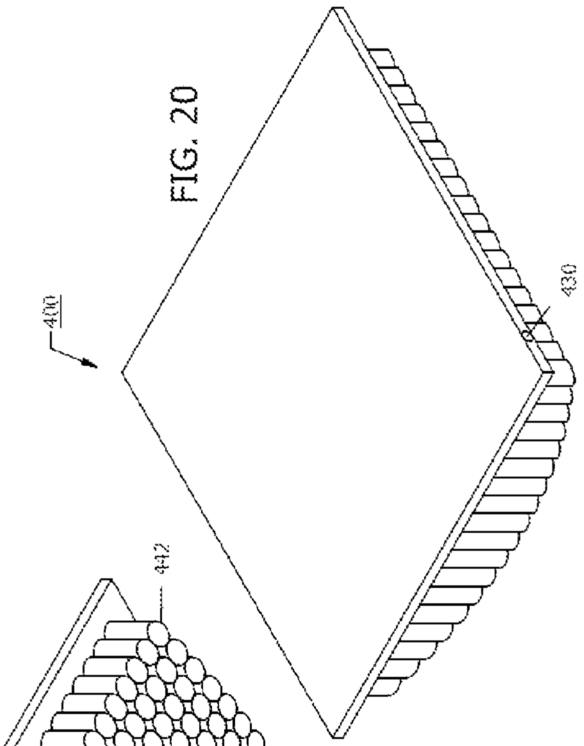
FIG. 20 is a perspective top view of plugin-adaptive.

| | |
|---|---|
| FIG.11: base with misc plugin and overlay | (Embodiment 1a) |
| FIG. 12: base with misc plugin | (Embodiment 1b) |
| FIG. 13: base with adaptive plugin | (Embodiment 2) |
| FIG. 14: base with massager plugin | (Embodiment 3) |

Reference numerals:

| | | | |
|---|---|---|---|
| 100 | Base | 200 | Misc plugin |
| 300 | Overlay | 400 | Adaptive plugin |
| 500 | Massager plugin | 600 | Spring bar |
| 700 | Ball joint | 800 | Socket joint |
| 900 | Reach arms | 901 | Stick reach arm, full-length |
| 902 | Stick reach arm, half length | 903 | Socket reach arm |
| 904 | Ball reach arm | | |

Figure 22:
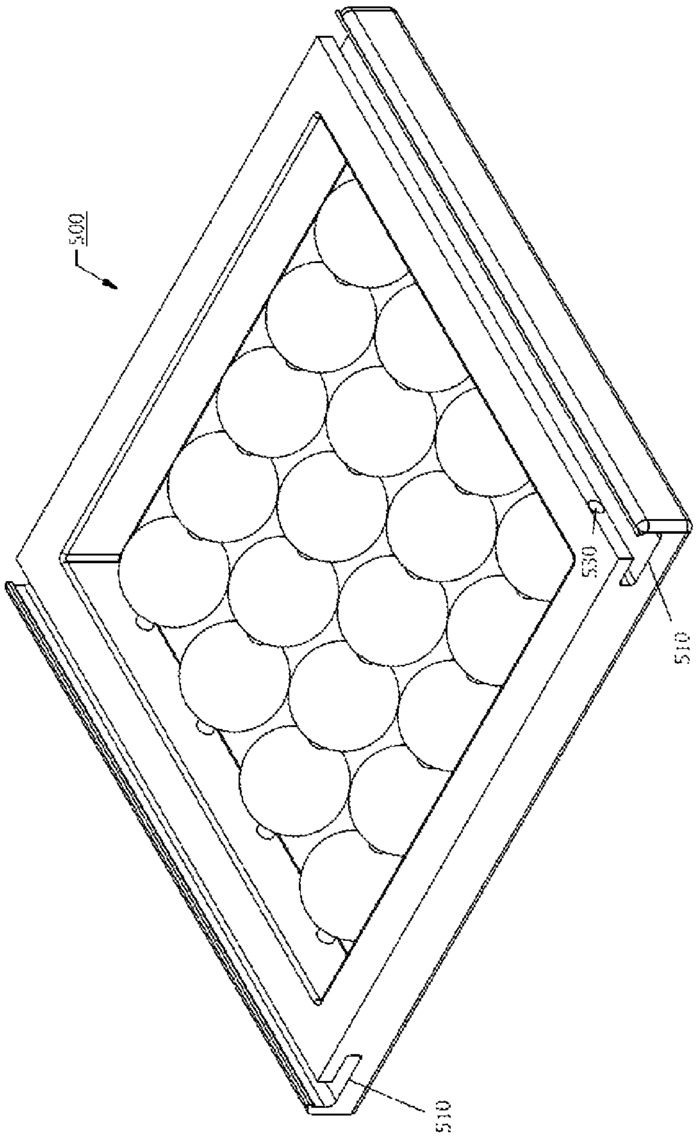
FIG. 22 is a perspective top view of plugin-massager.
Figure 21:
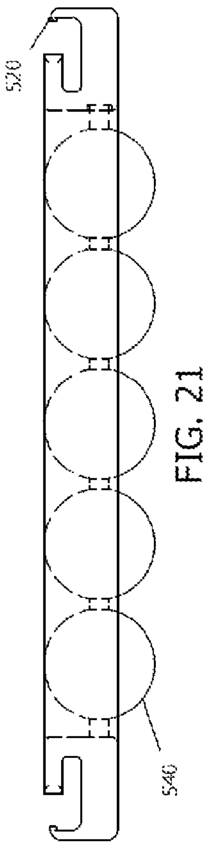
FIG. 21 is a front view of plugin-massager.
Figure 26:
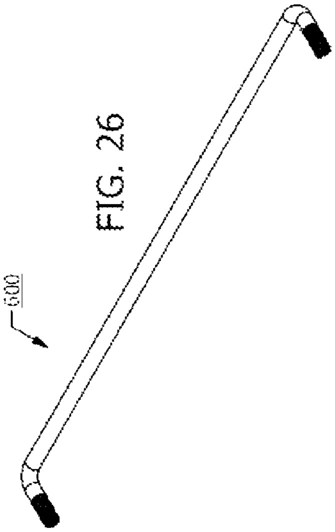
FIG. 26 is a perspective top view of spring-bar.
Figure 25:
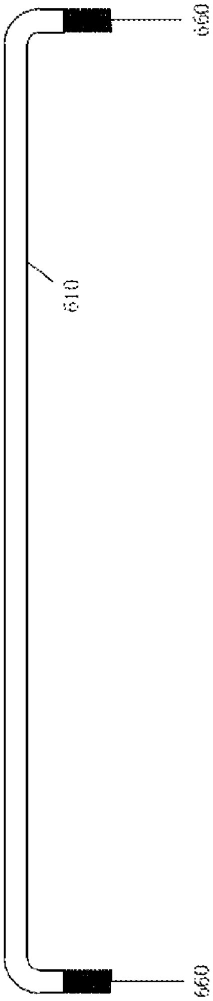
FIG. 25 is a top view of spring-bar.
Figure 24:
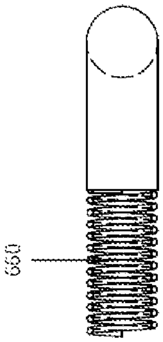
FIG. 24 is a side view of spring-bar.
Figure 23:
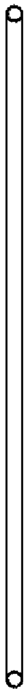
FIG. 23 is a front view of spring-bar.
Figure 34:
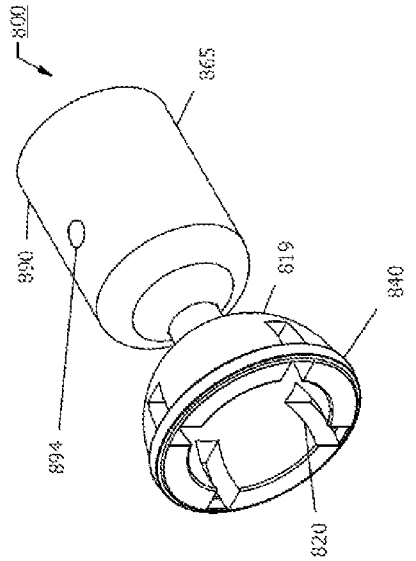
FIG. 34 is a perspective top view of socket joint.
Figure 32:
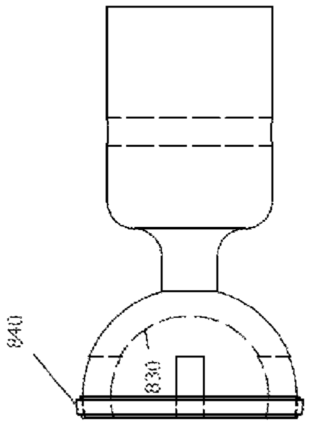
FIG. 32 is a side view of socket joint.
Figure 33:
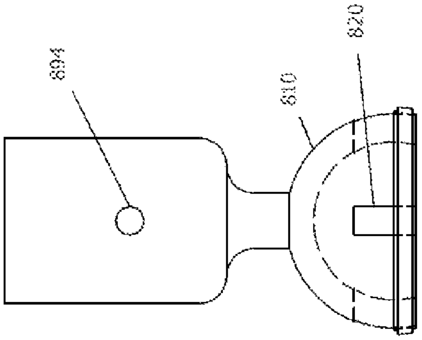
FIG. 33 is a top view of socket joint.
Figure 31:
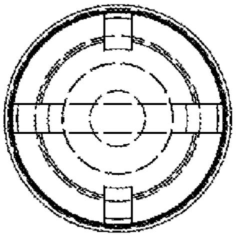
FIG. 31 is a front view of socket joint.
Figure 35:
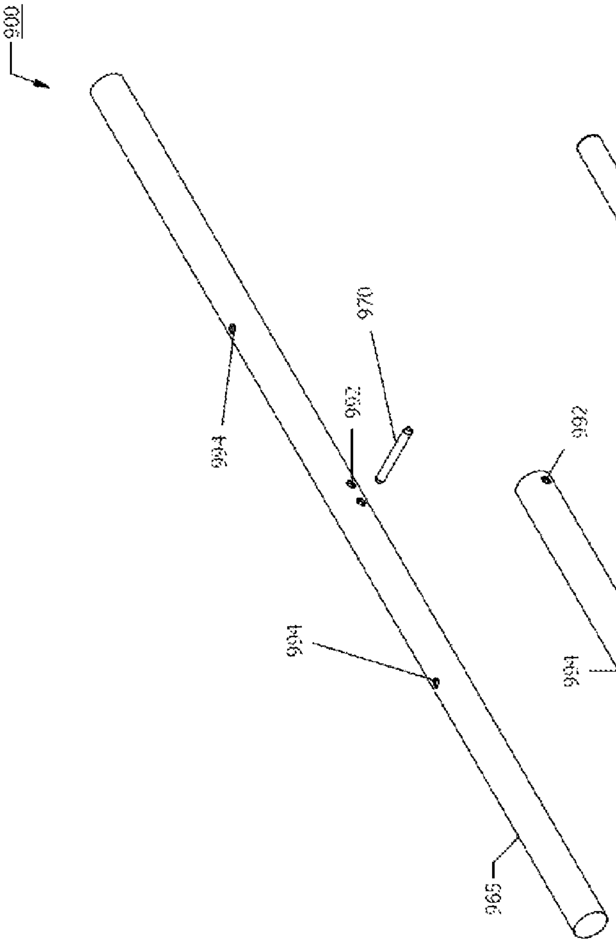
FIG. 35 is a full-length stick reach arm.
Figure 36:
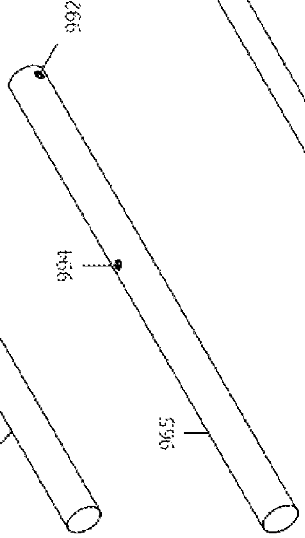
FIG. 36 is a half-length stick reach arm.

Sheet 2 of 11
Exploded view of plugin-misc
Shows an exploded view of Embodiment 1a, plugin-misc and shows a drawing of a person using the device on his back.
FIG. 21: Exploded view of Embodiment 1a
FIG. 22: Usage
Reference numerals:

| | | | |
|---|---|---|---|
| 100 | base | 190 | Base handle |
| 200 | Plugin-misc | 240 | Anti-sliding layer |
| 300 | overlay | 600 | spring bar |
| 700 | Ball joint | 901 | Stick reach arm, full-length |
| 902 | Stick reach arm, half-length | 970 | Fastener pin |
| 23 | Device | | |

Sheet 3 of 11
Base (100)
Shows details of base, to which plugins/overlays are attached.
FIG. 101: front view
FIG. 102: side view
FIG. 104: top perspective view
FIG. 105: bottom perspective view
Reference numerals:

| | | | |
|---|---|---|---|
| 102 | Column | 110 | Primary track |
| 120 | Side female track | 130 | Spring ball to snap into plugin hole |
| 140 | Spring behind ball | 150 | Spring bar groove |
| 160 | Spring bar head cavity | 165 | Tubular feature |

-continued

| | | | |
|---|---|---|---|
| 170 | Finger notch for spring bar | 180 | Weight-saving cavity |
| 190 | Handle | 192 | Middle fastener holes |
| 194 | End fastener holes | | |

Sheet 4 of 11
Plugin-misc (200)
Shows details of the miscellaneous plugin, to which an overlay may be attached.
FIG. 201: front view
FIG. 201A: front view Detail A
FIG. 204: perspective top view
FIG. 204C: perspective top view Detail C
FIG. 205: perspective bottom view
FIG. 205B: perspective bottom view Detail B
Reference numerals:

| | | | |
|---|---|---|---|
| 210 | Main track | 220 | Side male track |
| 230 | Snap plugin hole for base spring | 240 | Anti-sliding layer |
| 250 | Weight saving cavity | | |

Sheet 5 of 11
Overlay (300)
Shows details of an overlay, which could be a washcloth
FIG. 301: front view
FIG. 304: perspective top view
FIG. 305: perspective bottom view
Reference numerals:

| | | | |
|---|---|---|---|
| 310 | Surface for misc use: scrubbing, scratching, massaging, applying lotion, etc. | 320 | Material/pattern depending on use |
| 330 | Four sides to be held by 4 spring bars | | |

Sheet 6 of 11
Plugin-adaptive (400)
Shows the adaptive plugin using individually independent springs with a concave shape.
This plugin does not need side tracks.
FIG. 401: front view
FIG. 402: side view
FIG. 404: perspective top view
FIG. 405: perspective bottom view
Reference numerals:

| | | | |
|---|---|---|---|
| 410 | Main track | 430 | Snap hole for base spring ball |
| 440 | Curved individual springs | 442 | Cylinder enclosing spring |

Sheet 7 of 11
Plugin-massager (500)
Shows the massager plugin, which modifies plugin-misc for a purpose-built function: massage.
FIG. 501: front view
FIG. 504: perspective top view
Reference numerals:

| | | | |
|---|---|---|---|
| 510 | Main track | 520 | Side male truck |
| 530 | Snap plugin hole for base spring ball | 540 | Massage ball |

Sheet 8 of 11
Spring-bar (600)
Shows details of a spring-bar with a bend ending and a welded spring which is permanently fixed to the body of the base.
FIG. 601: front view
FIG. 602: side view
FIG. 603: top view
FIG. 604: perspective top view
Reference numerals:

| | | | |
|---|---|---|---|
| 610 | Bar | 660 | spring |

-continued

Sheet 9 of 11
Ball joint (700)
Shows details of a ball joint with the cylinder part insertable into base handle end.
FIG. 701: front view
FIG. 702: side view
FIG. 703: top view
FIG. 704: perspective top view
Reference numerals:

| | | | |
|---|---|---|---|
| 719 | Ball joint receiving socket reach arm | 765 | Tubular feature |
| 790 | End-handle insert | 794 | End fastener hole |

Sheet 10 of 11
Socket joint (800)
Shows details of a socket joint with the cylinder part insertable into base handle end.
FIG. 801: front view
FIG. 802: side view
FIG. 803: top view
FIG. 804: perspective top view
Reference numerals:

| | | | |
|---|---|---|---|
| 810 | Socket wall | 819 | Socket cup receiving ball reach arm |
| 820 | Socket wall slit | 830 | Joint ball cavity |
| 840 | Clamp to trap joint ball | 865 | Tubular feature |
| 890 | End-handle insert | 894 | End fastener hole |

Sheet 11 of 11
Reach arms (900)
Shows different kinds of reach arms: stick, socket, and ball.
Stick reach arms come in either half or full length.
FIG. 901: stick reach arm, full-length
FIG. 902: stick reach arm, half-length
FIG. 903: socket reach arm
FIG. 904: ball reach arm
Reference numerals:

| | | | |
|---|---|---|---|
| 970 | Fastener pin | 992 | Fastener holes for handle middle on stick reach arms |
| 994 | Fastener holes for handle end | | |

DETAILED DESCRIPTION OF THE INVENTION

Drawing sheet 1 of 11 shows included embodiments, which are not to be construed as the only possible embodiments consistent with the spirit of this invention.

a. Embodiment 1 has two versions:
   i. Embodiment 1a in FIG. 1 showing base with plugin-misc and overlay.
   ii. Embodiment 1b in FIG. 2 showing base with plugin-misc.
b. Embodiment 2 in FIG. 3 showing base with plugin-adaptive.
c. Embodiment 3 in FIG. 4 showing base with plugin-massager To show different permutations of reach arm configurations, Embodiment 1b shows no each arms; Embodiment 1a shows one socket reach arm (903) and one half-length stick reach arm (902); embodiment 2 shows one socket reach arm (903) and one ball reach arm (904); and, embodiment 3 shows one full-length stick reach arm (901).

Figure 5:
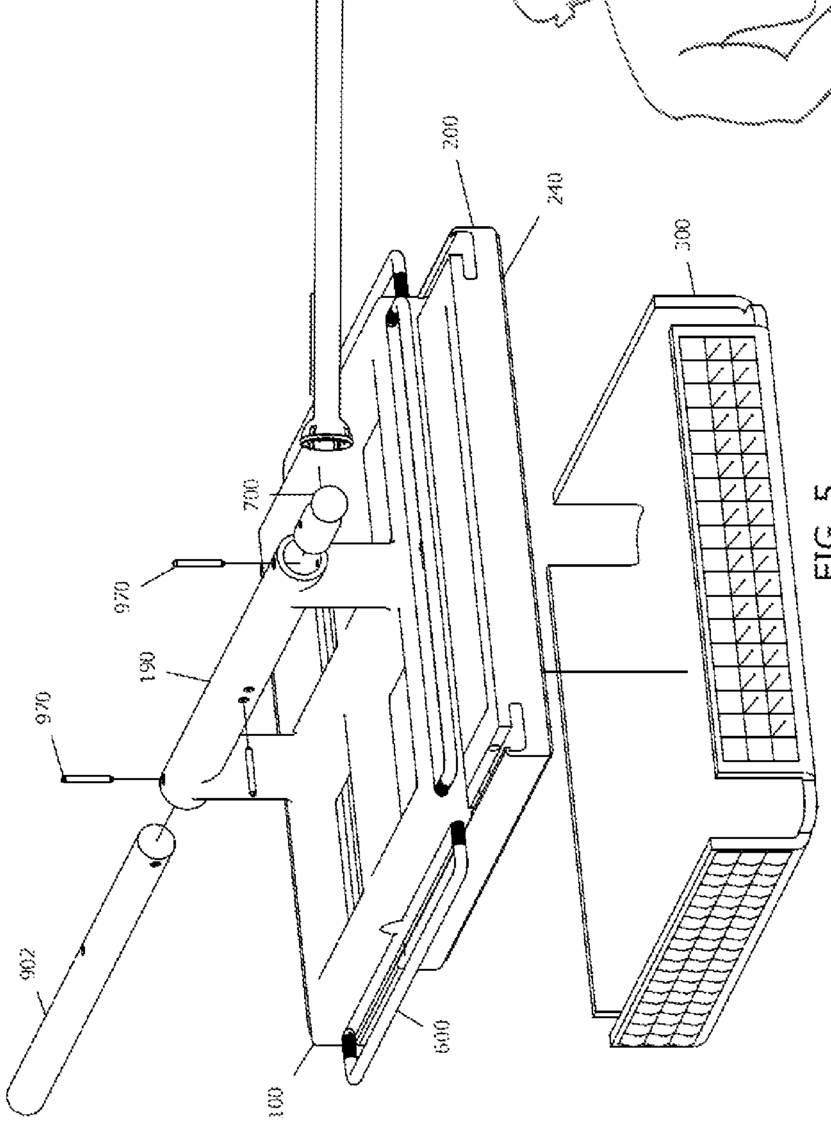
Figure 6:
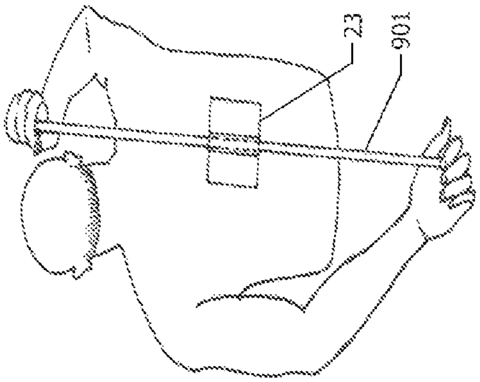
FIG. 6 shows usage of the device on someone's back.
Figure 10:
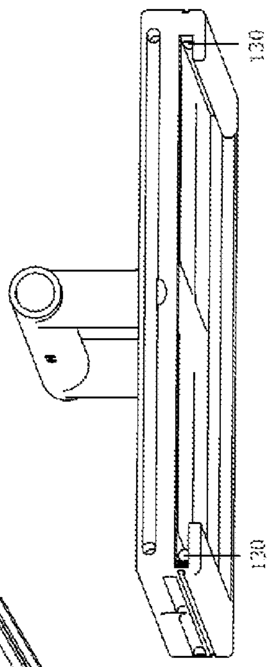
FIG. 10 is a bottom perspective view of base.
Figure 8:
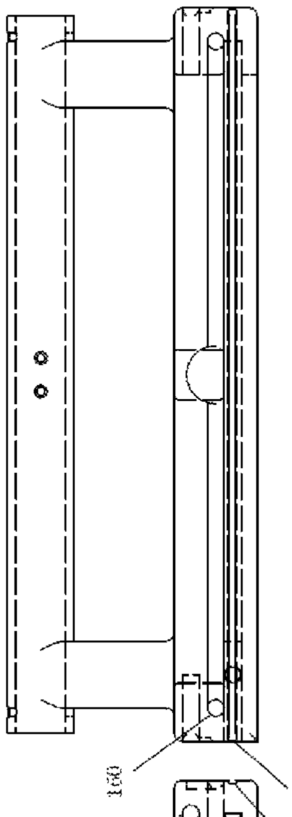
FIG. 8 is a side view of base.
Figure 9:
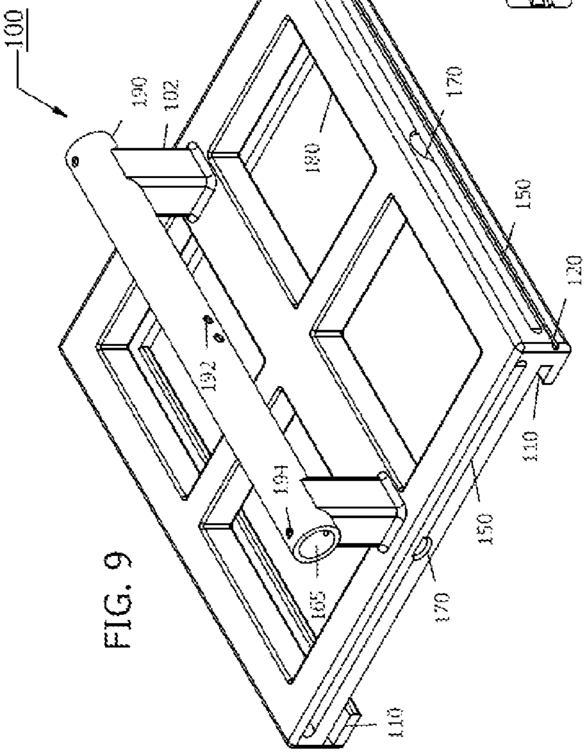
FIG. 9 is a top perspective view of base.
Figure 7:
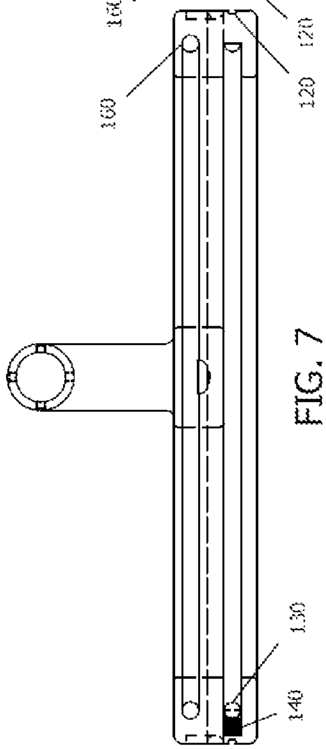
FIG. 7 is a front view of base.
Figure 12A:
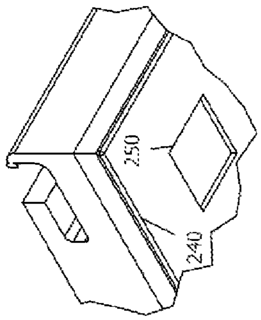
FIG. 12A is a perspective bottom view Detail A of plugin-misc.

FIG. 5 on sheet 2 of 11 shows an exploded view of Embodiment 1a and shows a drawing of a person using the device on his back in FIG. 6.

The next section is common and applicable to all embodiments in terms of description and operation. Sections thereafter inherit everything from the common section and add what is specific to a particular embodiment in its own section.

COMMON TO ALL EMBODIMENTS

Title

Base and base-relevant parts

Common Parts

Parts 100, 300, 600, 700, 800, or 900.

Description

The base part 100, is mandatory for all embodiments. Base 100 is one rectangular member with a hollow handle 190 mounted on two columns 102 to leave space for a hand grip. The handle has two vertical holes 194 at both ends and two horizontal holes 192 in the middle where fastener pin 970 is inserted. The tubular feature 165 is where reach arm tubular features 765, 865, and 965 are inserted. The top surface of the base may have weight-saving cavities 180. A spring bar groove 150 and finger notch 170 are on each side of the rectangle. Notch 170 is an example of the second means of pulling spring bar part 600 from its groove housing. Other equivalent means for pulling spring bar part 600 from its groove housing are possible. The base has a front primary track 110 that is mandatory for all plugins. Use of side female tracks 120 on the right and left sides of the base is optional. Plugin-adaptive part 400 is an example that does not use side tracks. Spring bar head cavity 160 is where springs 660 at the end of the spring bar are terminally fixed. The first means of locking into place a plugin's main track to base's primary track is illustrated by ball 130 which is permanently fixed to spring 140 behind it, both being part of the primary track side walls. Ball 130 of the base snaps into plugin's snap hole 230, 430, or 530.

Overlay part 300 on sheet 5 apply to all embodiments. Although the figure has the appearance of solid material, any material including a washcloth may serve as an overlay. The texture, pattern, and material of the overlay are purpose-specific.

Part 600: spring bar, sheet 8 of 11, is a U-shaped bar with bar 610 in the middle bent on both sides at 90-degree angle and ending with spring 660 which is fixed within the body of base part 100 (not shown). Springs 660 pull the spring bar into its groove housing 150 capturing an overlay such as a washcloth in between.

Part 700: ball joint, sheet 9 of 11, is needed to mount socket reach arm 903 thereon. The tubular feature 765 is fastened into hollow handle 190 at one end using centrically aligning hole 794 to the vertical reach arm end hole 194 using fastener pin 970. The ball joint 719 projects outside the end of handle 190 to be coupled to socket joint 819 for multi-axial free rotation.

Part 800: socket joint, sheet 10 of 11, is needed to mount socket reach arm 38 thereon. The tubular feature 865 is fastened into hollow handle 190 at one end using centrically aligning hole 794 to the vertical reach arm end hole 194 using fastener pin 970. The socket cup 819 is coupled to ball joint 719 for multi-axial free rotation.

The socket joint has socket wall 810 which has a plurality of vertical slits 820 to allow circumference expansion of the cup to snap ball 719 into socket cup 819. Flexible clamp 840 illustrates the third means of securing the ball inside the socket cup once they are snapped together. Other means of securing the ball inside the socket are possible.

Figure 37:
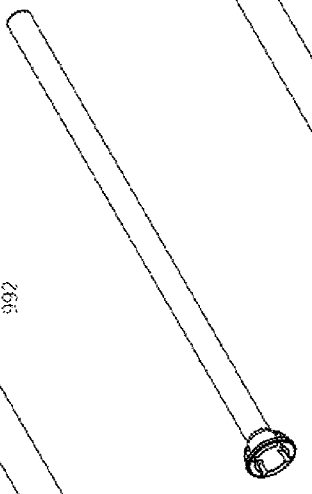
FIG. 37 is a socket reach arm.
Figure 38:
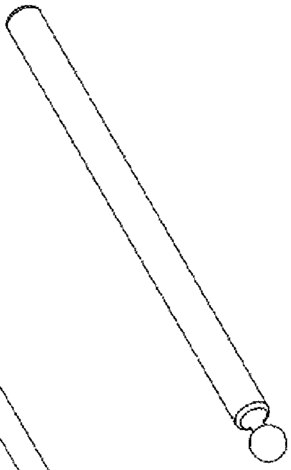
FIG. 38 is a ball reach arm.

Part 900: reach arms, is not drawn to scale since the length of a reach arm is much more than that of either side of the base. For example, as a matter of relative comparison, the typical length of a reach arm (when not telescopic) is probably more than that of a human arm length while the dimension of either side of the base rectangle is only a few inches. Reach arms are of two types: 1) directly attachable by insertion into the hollow handle 190; 2) indirectly attachable using a hollow handle insert to which the reach arm is connected with a matching reach arm. For instance, FIG. 38, ball reach arm, is matched with a socket joint part 800 while FIG. 37, socket reach arm, is matched with ball joint part 700. Full-length stick reach arm 35 is illustrated in embodiment 3 while half-length stick reach arm 902 is illustrated in Embodiment 1a (FIG. 1, sheet 1).

Operation

Common parts to all configurations are: 100, 300, 600, 700, 800, and 900. Base 100 is needed in all cases while reach arms and other parts are optional in all cases except for certain combinations. For instance, spring bars are used/needed only when overlays are used. Plugin-massager 500 does not need spring bars.

There are two primary configurations: a base with overlay, and a base with plugin (with optional overlay). To install overlay part 300, at least 2 of the 4 sides 330 need to be tall enough to be captured by spring bars part 600. This is one minimal configuration. Reach arms are discussed next.

Reach arms are optional and can be freely combined in any permutation. Included embodiments show configuration variations for the sake of illustration.

Embodiment 1b shown in FIG. 2 shows the base handle 190 with no reach arms. This is useful when using the device on reachable objects such as scrubbing one's arm.

When stick reach arm 901 or 902 is used, tubular feature 765, 865, or 965 is inserted into tubular feature 165 of handle 190 until horizontal fastener hole for handle middle 192 aligns with reach arm middle hole 992, and vertical fastener hole for handle end 194 aligns with reach arm end hole 994. Then, fastener pins 970 are inserted into 992 and 994.

Indirectly attached reach arms such as ball/socket reach arms (904/903) must follow the attachment of a corresponding insert such as 700/800.

FIG. 6 demonstrates usage with a full-length stick reach arm scrubbing one's back. The fact that the device is connected to both hands allows the user to direct, move, and press where needed. Rotational ability of reach arms enable scrubbing in circular pattern as well.

Embodiment 1

The only difference between embodiments 1a and 1b is that 1b does not have an overlay and does not have any reach arms. Only description of Embodiment 1a is included because it is more inclusive.

Title

Plugin-misc with overlay, socket reach arm, and half-length stick reach arm

Figures

FIGS. 11, 12, part 200; common parts 100, 300, 600, 700, 800, and/or 900

Description

FIG. 5 on sheet 2 of 11 shows an exploded view of Embodiment 1a where stick reach arm 902 is connected to the back of the handle via two fastener pins 970, one vertical at handle 194 end and the other horizontal at handle middle 192. The ball joint part 700 is connected to the front of the handle via one vertical pin 970. The ball snaps into the socket cup of socket arm 903. The base has 4 spring bars part 600, one on each side of the rectangle. FIG. 5 also shows plugin-misc part 200 sliding into base part 100.

Part 200: plugin-misc, sheet 4 of 11, serves as a general-purpose plugin to work with different overlays. The surface of plugin expands the full width under main track 210, which justifies the need for side male track 220 if a stronger structure is needed. Detail sections of the side female track show it as a kidney shape although other shapes are possible. Main track 210 slides into base's primary track 110. Side male track 220 gives weight and lateral stability for the plugin material around the main track 210. Spring ball 130 snaps into Snap hole 230 to lock the plugin-misc into base. The shown square pattern of anti-sliding layer 240 at the surface of the plugin in the bottom is only for illustration and so is the weight-saving cavities 250. Any pattern and material providing friction for overlays serves the intended purpose.

Operation

Exploded view FIG. 5 procedure:

a. install half-length stick reach arm 902 into back side of hollow handle 190
b. install vertical fastener pin 970 into back hole 194/994
c. install horizontal fastener pin 970 into back horizontal hole 192/992
d. install ball joint part 700 into the front side of hollow handle 190 until vertical holes are aligned
e. install vertical fastener pin 970
f. attach socket cup of reach arm 903 to ball joint
g. ensure socket cup clamp is tight
h. align plugin main track 210 to base primary track 110 and align side male track 220 to side female track 120, then slide plugin-misc part 200 into base 100
i. cap the bottom of plugin-misc with overlay part 300 ensuring sides of 300 are captured by base spring bars part 600
j. Use both reach arms to direct the device to target area Alternative Embodiment 2

Title

Plugin-adaptive with one ball reach arm and one socket reach arm

Figures

Part 400; common parts 100, 300, 600, 700, 800, and/or 900

Description

FIG. 3 shows a perspective view of Embodiment 2 with one ball reach arm, one socket reach arm, and plugin-adaptive part 400.

Plugin-adaptive, sheet 6 of 11, shows a front view FIG. 401, side view FIG. 402, perspective top view FIG. 404, and perspective bottom view FIG. 405. The third means of making the surface adaptive to the target object of use is illustrated by having individually independent springs, possibly of different strength per location, shown here arranged in curved shape. Means may be different depending on the intended function which may vary by target object of use. Springs are enclosed in cylindrical flexible casing (not shown). Springs may be spaced as required using spacers of different dimensions.

Snap holes for base spring ball 430 on the right and left sides are used to lock plugin-adaptive into base using base spring ball 130. An overlay part 300 such as a washcloth may be used and fixed in place using spring bars part 600 shown in FIG. 3. Having ball-and-socket reach arms gives free rotation on both ends.

Operation

Plugin-adaptive part 400 is slid into base primary track 110 until spring ball 130 snaps into hole 430 locking it in place. If an overlay such as a washcloth is desired, it can be fixed on the sides using spring bars part 600. Reach arms exert pressure on the base via handle allowing springs to adapt to body contours of the target object of use. Having reach arms gives better coverage, pressure, and directional control of the device over the target area. Operation of the ball-and-socket joint/reach arm was elaborated earlier in the common section of this specification.

Alternative Embodiment 3

Title

Plugin-massager with full-length stick reach arm

Figures

Part 500; common parts 100, 300, 600, 700, 800, and/or 900

Description

FIG. 4 shows a perspective view of Embodiment 3 with a full-length stick reach arms 901 and plugin-massager part 500.

Part 500: plugin-massager modifies plugin-misc only by replacing the middle part with a massage tool such as massage balls 540 and by removing spring bars part 600 since the plugin is purpose-built for massage where no overlays are needed. The message ball arrangement shown is only for illustration; other arrangements are possible. This embodiment is illustrated with a full-length stick reach arms 901.

Operation

Plugin-massager 500 is slid into the primary track 110 of base until spring ball 130 snaps into hole 530 locking it in position. Plugin main track 210 is aligned to base primary track 110 and side male track 220 is aligned to side female track 120, then plugin-massager 500 is slid into base 100. The full-length stick reach arms 901 passes through handle 190 on both sides and can be fixed using any two or more fastening holes.

CONCLUSION, RAMIFICATIONS, AND SCOPE

Accordingly, the reader will see that, certain specific challenges have been addressed and resolved by the illustrated embodiments while providing a modular platform for new plugins/overlays to fill other existing or future needs.

Modularity allows the base handle of the device to have different kinds of insert configurations in addition to a choice of plugins and/or overlays.

Overlays allow reusability of existing devices by fitting them on top of the base illustrated using side spring bars. An exfoliating washcloth is an example of that. A back scratcher overlay would be another foreseeable example that isn't illustrated.

Plugins give ultimate flexibility for adding purpose-built functionality. The adaptive plugin and massager plugin embodiments are examples of that. A back scratcher would also work as a plugin.

Although the device may be used with any configuration of reach arms, the ability to have the device between both handles solves multiple problems at once including reachability, directionality, coverage, and pressure.

Reachability has been addressed by reach arms that connect either directly to the base handle of the device or indirectly via a handle insert. Two handle inserts and matching arms were illustrated in different embodiments to give better directional control over the device via ball-and-socket joint which affords multi-axial free rotation of the reach arm allowing fine-tuned control of positioning the device over hard-to-reach areas. Other types of handle insert configurations with purpose-built functionality are possible.

Directionality naturally leads to better and faster coverage of desired target area.

Being able to exert the right amount of pressure added to good directional control over hard-to-reach areas are major benefits, especially when combined, not seen in prior art.

While the above description contains many specificities, these should not be construed as limiting the scope of the embodiments but as merely providing illustrations of some of the presently illustrated embodiments. For example, a special adaptive plugin may be created for different objects or different parts of the body. A plugin may come with a different shape of the adaptive surface than the shown convex shape; the shape could be concave or something else. The handle may have more than two sides or may have the angle between the sides different from the illustrated 180 degrees.

Thus, the scope of the invention should be determined by the appended claims and their legal equivalents, and not by the examples given.

I claim:

1. A modular platform for assembling a device to be used for miscellaneous applications unto a target object, comprising:

- a rectangular base with:
  - four sides;
  - a hollow handle on top of said base, said handle including a first end, a middle portion, and a second end, wherein said first end, said middle portion, and said second end each have a fastening feature configured to attach one or more elongated reach arms;
  - grooves on each of the four sides of said base configured to secure an overlay to said base;
  - a front primary track configured to receive a main track of one or more plugins;
  - right and left side female tracks configured to receive side male tracks of said one or more plugins,
- a plugin with a surface serving specific functionality, wherein said plugin further includes a main track configured to slide onto the front primary track of the base;

wherein the modular platform further includes:

- two male tracks on said plugin fitting into said side female tracks; or
- an overlay superimposing said base or superimposing a combination of said base and said plugin;
- a means of locking said plugin into place on said primary track; and
- a means of securing an overlay to said base, whereby said device, assembled from said rectangular base and said plugin, is configured to be used in the following two configurations:

- one configuration without any elongated reach arms attached to said hollow handle; or
- one configuration in which at least one elongated reach arm is attached to at least the first end of the hollow handle or the second end of the hollow handle thereby allowing the device to be positioned for better directional movement, coverage of the target object, and pressure over said target object area via said hollow.

2. The modular platform for assembling a device according to claim 1, further comprising:

- one or more elongated reach arms, wherein the one or more elongated reach arms are configured to directly insert into said hollow handle, passing through one of the first and second ends of the hollow handle or both ends of the hollow handle.

3. The modular platform for assembling a device according to claim 1, further comprising:

- a coupling inserted into either the first end of said hollow handle, the said second end of the hollow handle, or both the first end and the second end of the hollow handle, wherein the coupling comprises one half of a ball and socket joint configured to mate with another half of the ball and socket joint disposed on an elongated reach arm.

4. The modular platform for assembling a device according to claim 3, further comprising:

- at least one elongated reach arm comprising a complementary half of a ball and socket joint that is configured to mate with the one half of a ball and socket joint of the coupling.

5. The modular platform for assembling a device according to claim 1, wherein, the plugin comprises a plurality of plugins that are each configured to selectively attach to the rectangular base, and wherein each plugin has a specific functionality of at least one of: scrubbing, scratching, massage, and lotion/medication application.

6. The modular platform for assembling a device according to claim 1, further comprising one or more overlays that are each configured to selectively attach to the rectangular base, and wherein each overlay has a specific functionality of at least one of: scrubbing, scratching, massage, and lotion/medication application.

7. The modular platform for assembling a device according to claim 6, wherein at least one of the one or more overlays is a washcloth.

8. The modular platform for assembling a device according to claim 1, wherein said surface of said plugin is covered with an anti-sliding layer configured to provide a better grip with an overlay.

9. The modular platform for assembling a device according to claim 1, wherein said surface of said plugin is adaptive to a shape of the target object.

10. The modular platform for assembling a device according to claim 1, wherein said rectangular base or said plugin is bendably flexible.

11. The modular platform for assembling a device according to claim 1, further comprising said one or more elongated reach arms, wherein said one or more elongated reach arms are bendably flexible.

12. The modular platform for assembling a device according to claim 1, further comprising said one or more elongated reach arms, wherein said one or more elongated reach arms are of fixed length or telescopic.

* * * * *